United States Patent
Clarkson et al.

(10) Patent No.: US 9,971,735 B2
(45) Date of Patent: May 15, 2018

(54) INFORMATION RETRIEVAL USING SPARSE MATRIX SKETCHING

(71) Applicant: International Business Machines Corporation, Armonk, NY (US)

(72) Inventors: Kenneth L. Clarkson, Madison, NJ (US); David P. Woodruff, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 881 days.

(21) Appl. No.: 14/024,135

(22) Filed: Sep. 11, 2013

(65) Prior Publication Data

US 2014/0280428 A1    Sep. 18, 2014

Related U.S. Application Data

(63) Continuation of application No. 13/800,497, filed on Mar. 13, 2013, now abandoned.

(51) Int. Cl.
  *G06F 17/16* (2006.01)
(52) U.S. Cl.
  CPC .................. *G06F 17/16* (2013.01)
(58) Field of Classification Search
  CPC ........................................ G06F 17/16
  See application file for complete search history.

(56) References Cited

U.S. PATENT DOCUMENTS

| | | | |
|---|---|---|---|
| 6,748,098 B1 * | 6/2004 | Rosenfeld | 382/131 |
| 8,255,401 B2 | 8/2012 | Clarkson et al. | |
| 2003/0200097 A1 * | 10/2003 | Brand | 704/500 |
| 2011/0052023 A1 | 3/2011 | Garg et al. | |
| 2011/0064302 A1 | 3/2011 | Ma et al. | |
| 2011/0270835 A1 * | 11/2011 | Clarkson et al. | 707/737 |
| 2014/0348407 A1 * | 11/2014 | Nielsen et al. | 382/131 |

FOREIGN PATENT DOCUMENTS

WO    2012094804 A1    7/2012

OTHER PUBLICATIONS

Indyk, P.; Sparse Recovery Using Sparse Random Matrices AN-11300384; Apr. 26, 2008, 15 pages.

(Continued)

*Primary Examiner* — Chuong D Ngo
(74) *Attorney, Agent, or Firm* — Cantor Colburn LLP

(57) ABSTRACT

A system for retrieving stored data includes memory and a processor. The memory stores a first matrix, A, having dimensions n×d, a first sparse matrix, R, and a second sparse matrix, S. The processor receives an input value, k, corresponding to a selected rank to generate a second matrix, AR, by multiplying the first matrix, A, by the first sparse matrix, R. The second matrix, AT, has dimensions n×t. The processor generates a third matrix, SA, by multiplying the second sparse matrix, S, by the first matrix, A. The third matrix, SA, has dimensions t'×n, and the processor generates a fourth matrix, $(SAR)^-$, by calculating a Moore-Penrose pseudo-inverse of a matrix, (SAR), and approximating the first matrix, A by generating a fifth matrix, Ã, the fifth matrix defined as $AR \times (SAR)^- \times SA$.

15 Claims, 3 Drawing Sheets

(56) References Cited

OTHER PUBLICATIONS

Nelson, J. et al.; "On Deterministic Sketching and Streaming for Sparse Recovery and Norm Estimation", AN-12896841; 2012, 12 pages.
Salton, G. et al.; "Automatic Information Retrieval", Nov. 11, 2005, pp. 18.
Gilbert, Jr. et al.; "Sparse Partial Pivoting in Time Proportional to Arithmetic Operations", Mar. 29, 2007, 21 pgs.

* cited by examiner

INFORMATION RETRIEVAL USING SPARSE MATRIX SKETCHING

CROSS REFERENCE TO RELATED APPLICATIONS

This application is a continuation of U.S. patent application Ser. No. 13/800,497, filed Mar. 13, 2013, the disclosure of which is incorporated by reference herein in its entirety.

BACKGROUND

The present disclosure relates to information retrieval, and in particular to information retrieval using latent semantic structure via sparse sketching.

Information, such as document data, is stored in data structures such as matrices. Important or relevant data are often stored together with noise or other irrelevant data, filling the data structures or matrices. Locating the relevant data typically requires searching through large amounts of noise or other irrelevant data, resulting in long data processing times.

Data mining, information retrieval, web search and other systems utilize fast randomized approximation algorithms that allow users and systems to solve problems faster than with deterministic methods. Other methods for obtaining data include regression, sampling, iterative and conjugate-gradient methods. However, each of these methods for obtaining data is non-optimal.

SUMMARY

Embodiments of the invention include a system for retrieving stored data, including memory configured to store a first matrix, A, having dimensions n×d, a first sparse matrix, R, and a second sparse matrix, S. The system includes a processor configured to: receive an input value, k, corresponding to a selected rank and generate a second matrix, AR, by multiplying the first matrix, A, by the first sparse matrix, R, the second matrix, AR, having dimensions n×t, where t is defined as a polynomial of $(k \times \epsilon^{-1} \times \log n)$ and $\epsilon$ is a small constant greater than zero. The processor is further configured to generate a third matrix, SA, by multiplying the second sparse matrix, S, by the first matrix, A, the third matrix, SA, having dimensions t'×d and to generate a fourth matrix, $(SAR)^-$, by calculating a Moore-Penrose pseudo-inverse of a matrix, (SAR). The processor is further configured to approximate the first matrix, A, by generating a fifth matrix, Ã, the fifth matrix defined as $AR \times (SAR)^- \times SA$, receive a request to access at least one entry in the first matrix, A, and generate a response to the request by accessing an entry in the fifth matrix, Ã.

Additional features and advantages are realized through the techniques of the present disclosure. Other embodiments and aspects of the present disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Non-determinative methods for obtaining data from data structures may result in non-optimal results, such as long times to generate matrices including containing data. Embodiments of the invention relate to retrieving information using sparse sketches of a data matrix.

Figure 1:
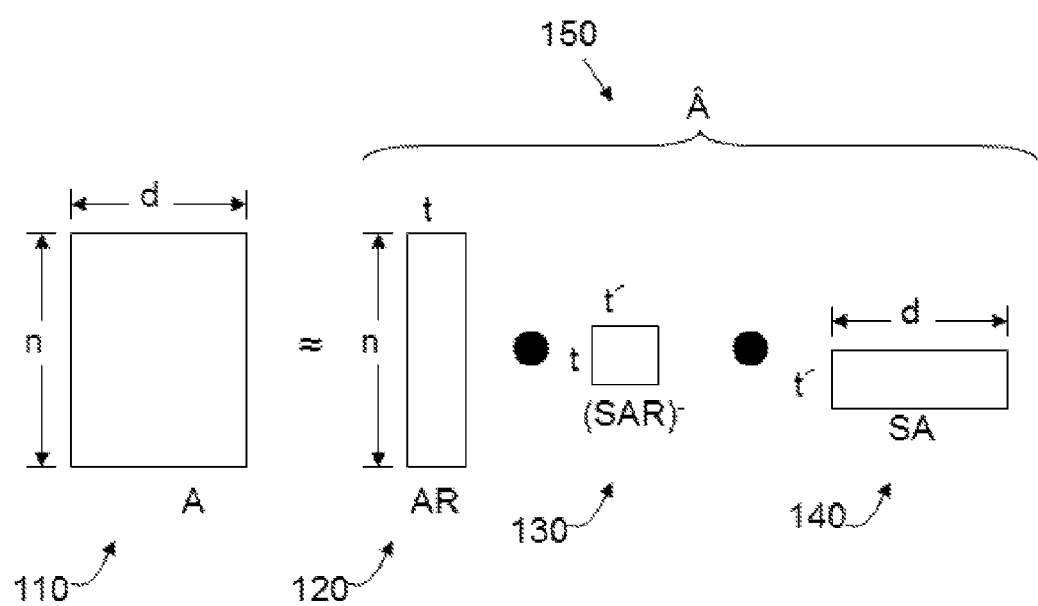
FIG. 1 illustrates a block diagram of approximating a data matrix according to one embodiment of the invention.
Figure 2:
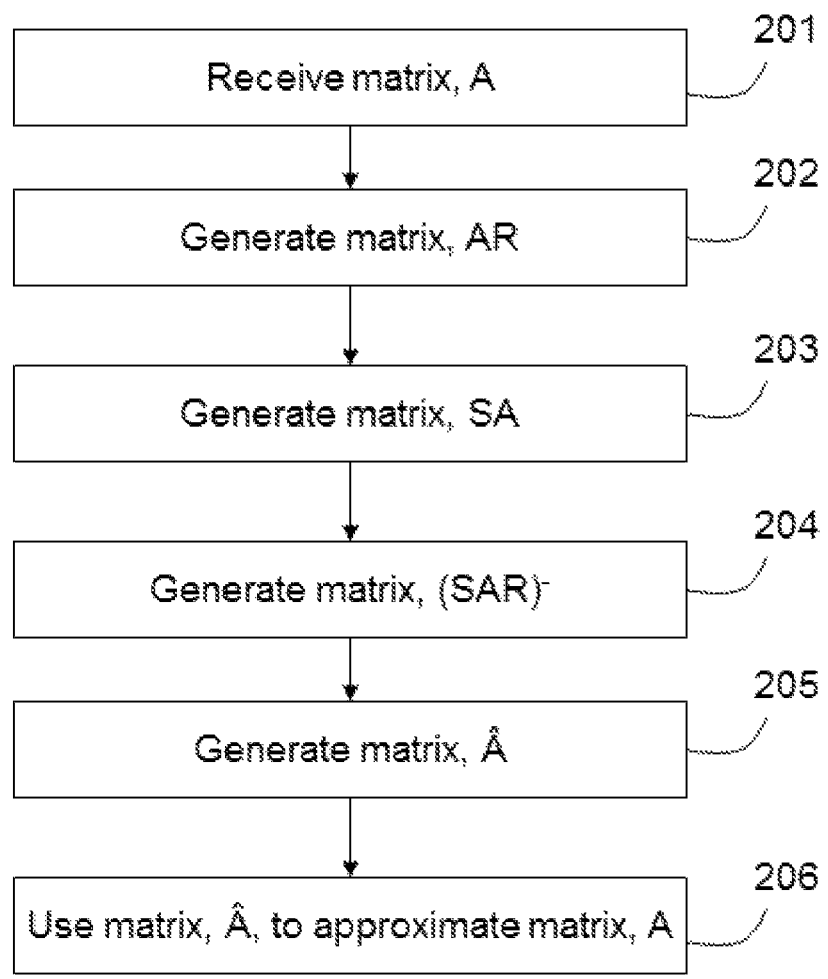
FIG. 2 illustrates a flowchart of a method for approximating a data matrix according to one embodiment of the invention.

FIG. 1 illustrates a block diagram of approximating a data matrix based on sparse data matrices and FIG. 2 illustrates a flow diagram of a method of approximating a data matrix based on sparse data matrices.

In block 201, a matrix of data, A, 110 is received having dimensions n×d. The matrix of data may be generated based on data received by a computer, such as document data, image data or any other type of data that may be organized in a data structure to be accessed by the computer at a later time by a user or system.

In block 202, a matrix, AR, 120 is generated. The matrix, AR, 120 may be generated by multiplying the matrix, A, 110 with a sparse matrix, R. The sparse matrix, R, may be configured to touch on each non-zero entry of the first matrix, A, exactly once. Alternatively, the sparse matrix, R, may be configured to touch on each non-zero entry of the first matrix, A, more than once but less than a predetermined number. In one embodiment, the matrix, AR, has dimensions n×t, where t is defined as a polynomial of $(k \times \epsilon^{-1} \times \log n)$, k is a selected rank less than a rank of the first matrix A and $\epsilon$ is a small constant greater than zero. In one embodiment, the sparse matrix, R, has dimensions d×t and is configured to touch on each non-zero entry of the first matrix, A, more than once and less than t times.

The matrix, AR, 120 may be a sketch of the matrix, A, 110 having many fewer rows than the matrix, A, 110. In one embodiment, the sparse matrix, R, is a tall and narrow matrix having many fewer columns than the matrix, A, 110. For example, each row of the sparse matrix, R, may have only one non-zero entry, and the remaining entries of the sparse matrix, R, may be zero.

In block 203, a matrix, SA, 140 is generated. The matrix, SA, 140, may be generated by multiplying a sparse matrix, S, with the matrix, A. The sparse matrix, S, may have dimensions t'×n and be configured to touch on each non-zero entry of the first matrix, A, exactly once. Alternatively, the sparse matrix, S, may be configured to touch on each non-zero entry of the first matrix, A, more than once but less than a predetermined number. In one embodiment, the matrix, SA, has dimensions t'×d, where t' is defined as a polynomial of $(k \times \epsilon^{-1} \times \log n)$, k is a selected rank less than a rank of the first matrix A and $\epsilon$ is a small constant greater than zero. In one embodiment, the sparse matrix, S, is configured to touch on each non-zero entry of the first matrix, A, more than once and less than t' times.

The matrix, SA, 140 may be a sketch of the matrix, A, 110 having many fewer columns than the matrix, A, 110. In one embodiment, the sparse matrix, S, is a short and flat matrix having many fewer rows than the matrix, A, 110. For example, each row of the sparse matrix, S, may have only one non-zero entry, and the remaining entries of the sparse matrix, S, may be zero.

In block 204, a matrix, (SARI, is generated. The matrix, (SARI, may be generated by generating a Moore-Penrose pseudo-inverse matrix of the matrix (SAR), corresponding to the sparse matrix, S, times the matrix, A, times the matrix, R. In one embodiment, the matrix, (SARI, has dimensions t×t'. In one embodiment, t' corresponds to $t^2$.

In block 205, a matrix, Ã, 150 is generated based on the product of the matrices AR, SA, and (SAR)⁻. In embodiments of the invention, the matrix, A, 150 may be used as an approximation of the matrix, A, 110. For example, in an embodiment in which the matrix, A, 110 includes data, such as document data stored in a data structure to be accessed by a user or system, a request to a computer for data of the matrix, A, 110 may be answered by accessing data entries of the matrix, Ã, 150.

In embodiments of the invention, the term sparse matrix, also referred to as sparse embedding matrix, describes a matrix composed mostly of zeros and having the remaining entries being −1 or +1 randomly distributed. In particular, $A \in R^{n \times d}$, n>d, and s(A) denotes the number of non-zero entries of a matrix A. It is assumed that s(A)≥n and there are no all-zero rows or columns in matrix A. For a parameter t, a random linear map $\Phi D: R^n \rightarrow R^t$ is defined as follows. First, h: [n]→[t] is a random map so that for each I∈[n], h(i)=t' for t'∈[t] with a probability of 1/t. In addition, $\Phi \in \{0,1\}^{t \times n}$ is a t×n binary matrix with $\Phi_{h(i),i}=1$, and all remaining entries are 0. In addition, D is an n×n random diagonal matrix, with each diagonal entry independently chosen to be +1 or −1 with equal probability. A matrix of the form ΦD may be referred to as a sparse matrix, or sparse embedding matrix.

If $\Delta_k := \|A - A_k\|_F$, where $A_k$ is the best rank-k approximation to A. Where a matrix A is n×n, and a value t=poly(k× $\epsilon^{-1}$×log n), where poly is a polynomial of (k× $\epsilon^{-1}$×log n). A sparse matrix R is d×t and the sparse matrix S is t²×n. Where Ã=AR×(SAR)⁻×SA, then Pr [∥A−A_k∥_F ≤(1+ε)∥A−A_k∥_F]≥3/5. In embodiments of the invention, AR, (SAR)⁻ and SA may be computed in O(s(A))+n×poly(k×$\epsilon^{-1}$×log n) time, where O represents a constant representing a proportion and s(A) represents number of non-zero entries of a matrix A.

Since R and S are sparse embedding matrices, SA and AR may be computed in O(s(A))+poly(k×$\epsilon^{-1}$×log n) time. In addition, SAR may be computed in n×poly(k×$\epsilon^{-1}$×log n) time and (SAR)⁻ may be calculated in poly(k×$\epsilon^{-1}$×log n) time. Since R and S are sparse embedding matrices, the time to compute SA, AR and SAR may be less than the time to compute the matrix A of dimensions n×d.

In one embodiment of the invention, the matrix, A, is a term-document matrix that stores data regarding the frequency with which terms appear in different documents. In another embodiment, the matrix, A, is a facial recognition database that stores the occurrence of predefined features in different images of faces. In embodiments of invention, the matrix, A, may correspond to any type of data structure having a matrix configuration to store data such that the data is searchable by accessing one or both of information regarding a row or a column of the matrix, A.

Figure 3:
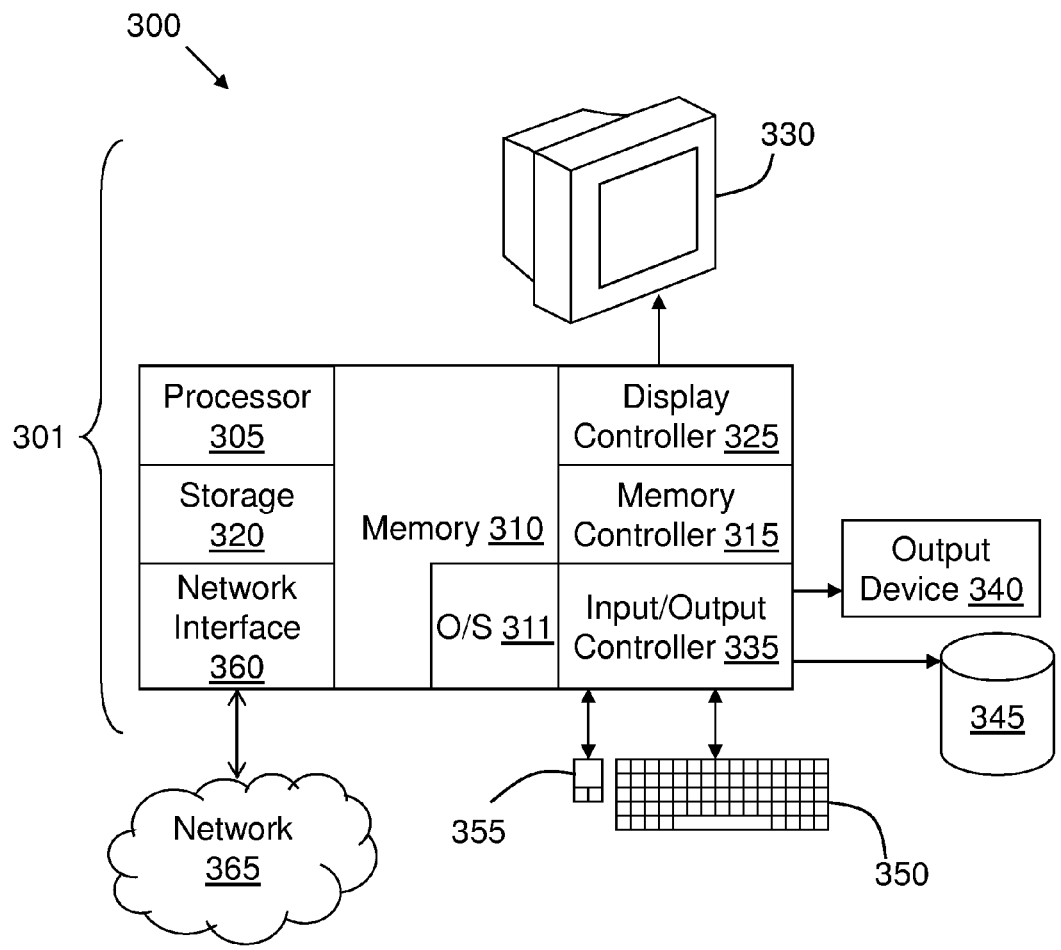
FIG. 3 illustrates a computer system according to an embodiment of the invention.

FIG. 3 illustrates a block diagram of a computer system 300 according to an embodiment of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 300 therefore may include general-purpose computer or mainframe 301.

In an exemplary embodiment, in terms of hardware architecture, as shown in FIG. 3, the computer 301 includes a one or more processors 305, memory 310 coupled to a memory controller 315, and one or more input and/or output (I/O) devices 340, 345 (or peripherals) that are communicatively coupled via a local input/output controller 335. The input/output controller 335 can be, for example, one or more buses or other wired or wireless connections, as is known in the art. The input/output controller 335 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 335 may access the output devices 340 and 345.

The processor 305 is a hardware device for executing software, particularly that stored in storage 320, such as cache storage, or memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (O/S) 311. The operating system 311 essentially controls the execution of other computer programs and provides scheduling, input-output control, file and data management, memory management, and communication control and related services.

In an exemplary embodiment, a conventional keyboard 350 and mouse 355 can be coupled to the input/output controller 335. Other output devices such as the I/O devices 340, 345 may include input devices, for example, but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In an exemplary embodiment, the system 300 can further include a network interface 360 for coupling to a network 365. The network 365 can be any type of network, such as an IP-based network for communication between the computer 301 and any external server, client and the like via a broadband connection, an optical fiber network, or any other type of network.

The network 365 transmits and receives data between the computer 301 and external systems. In an exemplary embodiment, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 301 is in operation, the processor 305 is configured to execute instructions stored within the memory 310, to communicate data to and from the memory 310, and to generally control operations of the computer 301 pursuant to the instructions.

In an exemplary embodiment, the methods of managing memory described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the invention, the process effect estimation system may utilize hardware and software within the computer system 300, including memory 310 or output devices 340 and 345 for storing process data in repositories, the processor 305 for analyzing process data, the display controller 325 for converting stored data into data for displaying graphical representations of the process data, the display 330 for displaying the process data, and the keyboard 350 and mouse 355 for receiving user input regarding processes and effects.

In embodiments of the invention, one or more of the matrix, A, the sparse matrices R and S, and the matrices AR, $(SAR)^-$ and SA may be stored in the computer system 300, such as the memory 310 and I/O devices 340 or 345. In addition, one or more of the matrices AR, $(SAR)^-$ and SA may be transmitted to the computer 301 via the network interface 360 or the input/output controller 335. In addition, the processor 305 may generate one or more of the matrices AR, $(SAR)^-$ and SA based on stored data or other stored matrices.

Technical effects and benefits include providing a close approximation to a matrix, A, based on sparse sketching of the matrix, A. Accordingly, data contained in the matrix, A, may be accessed with a high degree of reliability in less time than when accessing the matrix, A, directly.

As described above, embodiments can be embodied in the form of computer-implemented processes and apparatuses for practicing those processes. An embodiment may include a computer program product on a computer readable/usable medium with computer program code logic containing instructions embodied in tangible media as an article of manufacture. Exemplary articles of manufacture for computer readable/usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the embodiments. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the embodiments. When implemented on a general-purpose microprocessor, the computer program code logic segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

While preferred embodiments have been described above, it will be understood that those skilled in the art, both now and in the future, may make various improvements and enhancements which fall within the scope of the claims which follow.

What is claimed is:

1. A system for retrieving stored data, comprising:
    non-transitory processor readable memory configured to store a first matrix, A, having dimensions n×d, a first sparse matrix, R, and a second sparse matrix, S; and
    a processor configured to:
    receive an input value, k, corresponding to a selected rank;
    generate a second matrix, AR, by multiplying the first matrix, A, by the first sparse matrix, R, the second matrix, AR, having dimensions n×t;
    generate a third matrix, SA, by multiplying the second sparse matrix, S, by the first matrix, A, the third matrix, SA, having dimensions t'×d;
    generate a fourth matrix, $(SAR)^-$, by calculating a Moore-Penrose pseudo-inverse of a matrix, (SAR);
    approximate the first matrix, A, by generating a fifth matrix, $\tilde{A}$, defined as $AR \times (SAR)^- \times SA$;
    receive a request to access at least one entry in the first matrix, A; and
    generate a response to the request by accessing an entry in the fifth matrix, $\tilde{A}$,
    wherein the first matrix, A, corresponds to a data structure having a matrix configuration to store the data and provide the data as searchable via accessing a row or a column of the matrix, A,
    wherein the fifth matrix, $\tilde{A}$, comprises an approximation to the first matrix, A, that provides access to the data stored in the first matrix, A, and
    wherein the fifth matrix, $\tilde{A}$, provides access to the data with a degree of reliability in less time than when accessing the first matrix, A, directly.

2. The system of claim 1, wherein the first matrix, A, is a term-document matrix.

3. The system of claim 1, wherein the fourth matrix has dimensions t×t'.

4. The system of claim 1, wherein the sparse matrix, R, is configured to touch on each non-zero entry of the first matrix, A, exactly once.

5. The system of claim 1, wherein the sparse matrix, R, is configured to touch on each non-zero entry of the first matrix, A, more than once but less than a predetermined number.

6. The system of claim 1, wherein the sparse matrix, R, has dimensions d×t and is configured to touch on each non-zero entry of the first matrix, A, more than once and less than t times.

7. The system of claim 1, wherein each row of the sparse matrix, R, has only one non-zero entry, and the remaining entries of the sparse matrix, R, are zero.

8. The system of claim 1, wherein the sparse matrix, S, has dimensions t'×n and is configured to touch on each non-zero entry of the first matrix, A, exactly once.

9. The system of claim 1, wherein the sparse matrix, S, is configured to touch on each non-zero entry of the first matrix, A, more than once but less than a predetermined number.

10. The system of claim 1, wherein the sparse matrix, S, is configured to touch on each non-zero entry of the first matrix, A, more than once and less than t' times.

11. The system of claim 1, wherein each row of the sparse matrix, S, has only one non-zero entry, and the remaining entries of the sparse matrix, S, are zero.

12. The system of claim 1, wherein the second matrix, AR, is a sketch of the matrix, A, having many fewer rows than the matrix, A.

13. The system of claim 1, wherein the third matrix, AR, is a sketch of the matrix, A, having many fewer columns than the matrix, A.

14. The system of claim 1, wherein the first matrix, A, comprises term-document matrix that stores the data, and
   wherein the data comprises a frequency with which terms appear in different documents.

15. The system of claim 1, wherein the first matrix, A, comprises a facial recognition database that stores the data, and
   wherein the data comprises occurrences of predefined features in different images of faces.

\* \* \* \* \*